United States Patent [19]

Waitkins et al.

[11] 3,861,946

[45] Jan. 21, 1975

[54] TITANIUM DIOXIDE NACREOUS PIGMENTS AND PROCESS FOR THE PREPARATION THEREOF

[75] Inventors: George R. Waitkins, Croton-on-Hudson; Carmine V. Deluca, Jr., Peekskill; Harold A. Miller, White Plains; Forrest S. Wilcox, Yorktown Heights, all of N.Y.

[73] Assignee: The Mearl Corporation, Ossining, N.Y.

[22] Filed: July 21, 1972

[21] Appl. No.: 273,747

[52] U.S. Cl. ......... 117/100 B, 106/288 B, 106/291, 106/300, 106/308 B, 117/159
[51] Int. Cl. .......................... B44d 1/02, C09k 1/60
[58] Field of Search ......... 117/100 B, 159; 106/291, 106/300, 308 B, 288 B; 423/172, 171

[56] References Cited
UNITED STATES PATENTS

| | | | |
|---|---|---|---|
| 2,941,895 | 6/1960 | Haslam | 106/193 |
| 3,018,186 | 1/1962 | Jenkins | 106/300 X |
| 3,071,482 | 1/1963 | Miller | 106/148 |
| 3,087,828 | 4/1963 | Linton | 106/300 X |
| 3,340,006 | 9/1967 | Mochel | 423/592 |
| 3,341,291 | 9/1967 | Mabbs et al. | 106/300 X |
| 3,395,203 | 7/1968 | Morita | 264/141 |
| 3,437,515 | 4/1969 | Quinn | 117/159 X |
| 3,453,129 | 7/1969 | Hoffmann et al. | 106/300 |

Primary Examiner—William D. Martin
Assistant Examiner—Stuart D. Frenkel
Attorney, Agent, or Firm—Ostrolenk, Faber, Gerb & Soffen

[57] ABSTRACT

Nacreous pigments comprising crystalline $TiO_2$ platelets, either supported on corresponding plate-like calcium sulfate anhydrite particles or self-supporting. The pigments are prepared by depositing amorphous $TiO_2$ coatings on plate-like gypsum substrate particles, calcining the resulting product to convert the gypsum to the anhydrite and crystallize the $TiO_2$ and, when an unsupported pigment is to be produced, dissolving out the anhydrite substrate. The crystalline $TiO_2$ is produced in the form of either rutile or anatase.

12 Claims, 2 Drawing Figures

3,861,946

TITANIUM DIOXIDE NACREOUS PIGMENTS AND PROCESS FOR THE PREPARATION THEREOF

BACKGROUND OF THE INVENTION

1. Field of the Invention

This invention relates to nacreous pigments which are useful for cosmetic formulations and in various plastic articles and coatings. More particularly, it relates to improved nacreous titanium dioxide ($TiO_2$) pigments and methods for the preparation thereof.

2. The Prior Art

Nature's nacreous pigment, plate-like guanine microcrystals from fish, has only limited uses because of high cost, source variations, and unsuitability for some applications. As a result, a number of synthetic nacreous pigments previously have been developed. One of the most important of these, $TiO_2$ coated mica, consists of mica platelets having adherent crystalline $TiO_2$ coatings thereon. The composite pigment has good reflectivity characteristics, a high degree of stability with respect to heat and chemical agents, and is non-toxic, making it suitable for cosmetic applications. Such pigments are described, for example, in Klenke et al., U.S. Pat. No. 3,087,827; Linton U.S. Pat. No. 3,087,828; Rieger et al., U.S. Pat. No. 3,418,146; and Quinn et al., U.S. Pat. No. 3,437,515.

The $TiO_2$-coated mica pigment is, however, subject to the physical limitations of the mica, a natural product. Although procedures have been developed to classify and purify the mica, certain variations from the natural source persist through to the final product. Moreover, most sources of mica are unsuitable for use in nacreous pigments. Only a few souces of mica are of practical importance since many are quite dark and others cannot be adequately ground to yield the desired dimensions for the pigment platelet substrates.

Additionally, mica is not a truly white material, and darkens considerably during the calcination process employed in the preparation of the $TiO_2$-coated mica product. Undesirable color effects result. Finally, the $TiO_2$-coated mica product tends to have a glinty appearance and does not have a smooth or soft luster equivalent to other nacreous pigments. This is an inherent characteristic of the relatively large size mica particles themselves.

Unsupported $TiO_2$ pigments have also been disclosed in the technical literature. See, e.g., Haslam U.S. Pat. No. 2,941,895; Jenkins U.S. Pat. No. 3,018,186; and Miller U.S. Pat. No. 3,071,482; Morita U.S. Pat. No. 3,395,203; Mochel U.S. Pat. No. 3,340,006; and Japan 35-15579 (275573). Generally, the methods of preparation of such pigments involve the hydrolysis of $TiCl_4$ or a titanium ester on a flat surface of during extrusion through a narrow orifice, to form the desired $TiO_2$. The latter is produced in relatively small yield as an amorphous material containing hydrated forms of $TiO_2$ as well as some contamination from the starting reactants.

Such products are not very stable, and react with components of certain systems in which they are incorporated, such as nitrocellulose lacquers. Their light stability is also less than desirable, making them unsuitable for various applications in both cosmetics and plastics. Further, it is difficult to accurately regulate their thicknesses as is necessary in the preparation of nacreous pigments exhibiting predetermined interference colors. In addition, calcining unsupported $TiO_2$ pigment platelets prepared as previously described results in a high degree of fracturing of the platelets, primarily due to the absence of a support or substrate therefor. Control over platelet thickness during such a calcination is difficult, if not impossible, to achieve.

It is among the objects of the present invention to provide improved supported and unsupported $TiO_2$ nacreous pigments which may be used in a wide variety of cosmetic and plastic applications, and which possess improved stabilities, lusters, mechanical integrities, and other properties, as compared with previously proposed $TiO_2$ and like nacreous pigments.

A further object of the invention is to provide a method for the preparation of such pigments in high yield and with precise control over the particle sizes and thicknesses which determine nacreous pigment characteristics.

These and other objects and advantages of the invention will be apparent from consideration of the following detailed description of preferred embodiments thereof, taken in connection with the following drawing in which:

SUMMARY OF THE INVENTION

It has been found that improved titanium dioxide nacreous pigments may be provided, comprising $TiO_2$ platelets having thicknesses of from 5 to 500 nm (nanometers) and either coated on and supported by plate-like calcium sulfate anhydrite particles having lengths of from 5 to 70 microns and thicknesses of from 0.1 to 1.0 micron, or self-supporting. Both the anhydrite supported $TiO_2$ pigments (hereinafter the TCC pigments) and the unsupported $TiO_2$ pigments (hereinafter the UST pigments) are suitable for general nacreous pigment applications in plastic or lacquer casting, molding or coating, and in cosmetics.

The $TiO_2$ layers of the nacreous pigments of the invention are responsible for the optical characteristics thereof. The calcium sulfate substrate of the TCC pigments has an index of refraction of about 1.52 to 1.61, comparable to the indexes of plastic media (e.g., 1.45 to 1.60) in which the pigment is generally dispersed, and substantially lower than the indexes of the cyrstalline $TiO_2$ (rutile-2.75; and anatase-2.53). The reflectivity of nacreous pigments is directly related to their index of refraction, the crystalline pigments hereof thus exhibiting substantially greater reflectivities than many previously available $TiO_2$ pigments incorporating amorphous and partially hydrated forms of $TiO_2$ having indexes of refraction of about 1.8–1.9.

Employing the method of preparation described below, the nacreous pigments of the invention may be provided in a wide range of reflection colors, exhibiting the optical interference effects described, for example, in "The Properties of Nacreous Pigments," Greenstein and Miller, Techinical Papers, Vol. XIII, annual Technical Conference, Society of Plastic Engineers, May 1967, or in "Nacreous Pigments," Greenstein, Encyclopedia of Polymer Science and Technology, Vol. 10, 1969, pages 193–215.

1. The TCC Pigments

The TCC pigments are particularly useful in plastic media, employing the usual techniques of compression or extrusion molding with thermoplastic materials, such as polyethylene or polypropylene. TCC is advantageous in that the pigment maintains its geometric or mechanical integrity, and is not seriously broken down mechanically by the extreme shear conditions encountered in such molding operations. The TCC pigment can also be advantageously incorporated during the polymerization of, for example, acrylates, methacrylates, and the unsaturated polyester resins, as well as in vinyl resins, cellulose acetate, and other polymeric systems. The TCC pigments do not suffer from glintiness, and have smooth and rather soft appearances. This is particularly advantageous for the TCC pigments which exhibit interference colors, and which thus impart soft and pleasing reflection color effects to plastic articles.

The TCC pigments are also suitable for use in the cosmetic field in lipstick formulations, primarily due to the ability of such pigments to maintain their geometric integrity under the conditions which are used to incorporate the pigment in the molten lipstick base.

Composite pigments formed by the precipitation of one component upon or in the presence of another are well known in the pigment field. Thus, rutile $TiO_2$-anhydrite composite pigments are described, for example, in Hoffmann et al., U.S. Pat. No. 3,453,129. The TCC pigments of the present invention are, however, quite distinct from such combined pigments in that in the present materials both the calcium sulfate and $TiO_2$ strata are provided in thin, flat and plate-like cyrstalline form, the calcium sulfate serving only as a substrate for the composite nacreous pigment. On the other hand, the principal purpose for incorporating calcium sulfate in the combination pigments of the prior art is to modify the specific gravity of the pigment to provide optimum handling characteristics. Such composite pigments are not suitable for use as nacreous pigments, and cannot be converted to UST pigments suitable for similar purposes.

2. UST Pigments

The UST pigments hereof are in the from of crystalline platelets having lengths of from about 5 to 70 microns and thicknesses of from about 5 to 500 nm, and incorporate residual calcium sulfate substrate particles in amounts of up to about 20 percent, preferably from about 2 to 16 percent, by weight thereof. The pigments also include the following elements in the oxide forms: silicon, tin, or tin and aluminum. These elements remain in the oxide forms as a result of preparation of the pigments in the manner described hereinafter. The exact forms of the oxides are not known, and complex compounds involving each oxide and titanium are possible.

The UST pigments may be most advantageously used in surface coatings, e.g., in the manufacture of simulated pearls, since the combination of very high index of refraction and relatively low specific gravity imparts high reflectivity per unit weight to such products. For the same reason the UST pigments can be used in coating applications at very low loadings, e.g., in the range of 1/10–½ of the concentrations at which other nacreous pigments are suitable. When so utilized such products provide good luster with a high degree of smoothness and with some softness is appearance.

In view of their lack of toxicity, the UST pigments find major application in cosmetics, e.g., in nail enamel formulations, in place of the expensive and scarce natural product, pearl essence. Such pigments, being available as dry, compressible powders, are also quite suitable for pressed powder compacts and face powders. Further, UST pigments may be employed in various types of eye make-up formulations, being smooth and easily handled in these formulations, lacking glintiness, and displaying good luster and color reflectivity.

The UST pigments are also advantageous for use in coatings for automobiles, both exterior and interior surfaces thereof, as well as for household appliances. These pigments impart nacreous or iridescent appearances with some softness and without glintiness, to such surfaces. They can be used in any formulations used in the art. In addition, the use of the UST pigments in manufacture is preferred over other nacreous pigments which may be quite expensive and impose health hazards.

3. Method of Preparation of the $TiO_2$ Pigments

In accordance with a further feature of the present invention, the nacreous pigments hereof are prepared by depositing an amorphous coating of the $TiO_2$ on plate-like gypsum particles having lengths varying from about 5 to 70 microns and thicknesses of from about 0.1 to 1.0 micron, calcining the coated platelets to form the aforesaid TCC pigments and, when it is desired to provide unsupported pigments, dissolving the calcium sulfate anhydrite substrate to leave the UST pigments containing up to about 20 percent by weight of the anhydrite.

When it is desired to produce the $TiO_2$ pigments in the rutile form (which, as noted above, has a higher index of refraction than the anatase form), the plate-like gypsum particles are pre-treated with an acidic solution of a soluble tin compound at the commencement of or during the initial portion of the $TiO_2$ coating process. Use of this tin compound pre-treatment may also be coupled with treatment of the TCC pigments, prior to calcining, with a soluble aluminum compound. This further treatment has been found to result in the formation of a calcined rutile-containng product exhibiting markedly improved luster and smoothness.

Formation of the $TiO_2$-containing pigments hereof in the anatase form is less preferred since, in addition to the fact that anatase has a lower index of refraction than rutile, the former additionally possesses lower light stability than the rutile form of $TiO_2$. It has, however, further been found in accordance herewith that anatase-containing pigments having improved luster and stability characteristics may be produced if the $TiO_2$ coated gypsum particles are treated with a dilute solution of a silica-producing material, e.g., sodium silicate, prior to drying and calcining the same. Employing such a treatment, it is possible to calcine the product at relatively high temperatures and thereby produce anatase-containing pigments having substantially improved lusters and stabilities.

The method of preparation of the $TiO_2$-containing pigments hereof possesses a number of distinct advantages. First, the method may be controlled with a high degree of precision to form the plate-like gypsum particle substrates and amorphous $TiO_2$ coatings with predetermined, reproducible dimensions. The method of preparation is completely synthetic, is not dependent upon the characteristics of natural products, e.g., mica substrates or natural pearl essence, and is, therefore, accurately controllable and reproducible. Further, employing the various parameters noted above and discussed more fully hereinafter, thin, smooth and uniform crystalline $TiO_2$-containing pigments are produced which have mechanical properties facilitating further processing as well as excellent and reproducible optical reflection characteristics.

PREFERRED EMBODIMENTS OF THE INVENTION

The preparation of preferred forms of the TCC and UST pigments hereof is described hereinafter. In this description and in the specific examples set forth below, all parts and percentages are given by weight and temperatures in degrees Centigrade unless otherwise indicated.

1. Preparation of the Plate-Like Gypsum Particles for the Pigment Substrates

The plate-like gypsum particles upon which the $TiO_2$ pigments hereof are formed are inert and colorless, imparting no deleterious effects or colors to the ultimate pigments. The gypsum ($CaSO_4.2H_2O$) forms in single crystals having a monoclinic space lattice and exhibiting flat, arrowhead-like shapes incorporating slight striations or chevrons upon viewing by reflection microscopy. The gypsum particles are suitably formed with lengths varying from about 5 to 70 microns, preferably at least about 10 microns, and desirably about 20-35 microns, and thicknesses varying from about 0.1 to 1.0 micron, preferably about 0.2-0.5 micron. Some crystalline platelets in a batch may be less than 5 microns in length, due to breakage, but the effectiveness as a nacreous pigment is nearly lost if the average length is 5 microns, and it should be at least about 10 microns in length on average.

Gypsum particles having such precise dimensions and configurations may be readily and reproducibly prepared by reacting a water-soluble calcium compound and a water-soluble sulfate in aqueous dispersion. Typical calcium compounds which may be so reacted include calcium acetate, calcium chloride, calcium nitrate, calcium bromide, calcium iodide, calcium ferrocyanide, calcium propionate, and calcium butyrate. Suitable sulfates comprise sodium sulfate, potassium sulfate, sulfuric acid, sodium hydrogen sulfate, potassium hydrogen sulfate, ammonium sulfate, ammonium hydrogen sulfate, and the like. It is most convenient and economical to react calcium chloride ($CaCl_2.2H_2O$) and sodium sulfate ($Na_2SO_4$), as illustrated in step 11 in the attached flow sheet.

The calcium and sulfate salts may be reacted in any desired proportions. Ratios close to stoichiometric are quite satisfactory and are in fact preferred from the point of view of economy. For convenience, it is preferred that one solution be in a dilute form in the reactor (e.g., the sodium sulfate) while the other is added in a concentrated form to the reaction mixture. Utilizing calcium chloride and sodium sulfate reactants, for example, the calcium and sulfate salts may be reacted in weight ratios of from about 1:1 to 1:30, preferably from about 1:10 to 1:30, respectively. Calcium chloride solutions so reacted generally have concentrations of from about 5 percent to 50 percent, preferably about 30-50 percent, whereas sodium sulfate solutions so reacted may have concentrations of from about 0.2 percent to 10 percent, preferably about 1-5 percent.

The gypsum precipitation is suitably carried out at about 40° to 80° C., most conveniently at about 50°-60° C, with agitation, in a glass or stainless steel reactor, for example. Generally, precipitation commences within 5-30 seconds, and mixing should be contined for 10-60 minutes, with about 30 minutes mixing preferred.

There is a tendency for the gypsum crystals to precipitate with morphologies other than the desired flaat and plate-like, arrowhead shape, e.g., in the shape of rods or thick boats neither of which is suitable as a substrate for a $TiO_2$ nacreous pigment. In order to decrease the occurrence of these undesired crystal morphologies, trace amounts of certain organic acids are incoporated during the precipitation of the gypsum particles. The organic acids so utilized are low molecular weight, water-soluble carboxylic acids having from about one to eight carbon atoms and incorporating more than one functional group per molecule. Typical of the useful acids are succinic acid, gluconic acid, glycine, citric acid, malic acid, alanine, oxalic acid and glycylgylcine. The soluble salts of the organic acids are also effective. Further, certain water-soluble polymers can be used such as gelatin, polyacrylic acid, and polyacrylamide. The organic acid, acid salt, or polymer additive is employed at concentrations in the range of from about 2 to 2,000 ppm, preferably from about 2-200, and desirably at about 5-25 ppm, based on the weight of the total reaction mixture.

As shown in step 12 of the drawings, the calcium sulfate precipitate thus formed is separated (filtered or centrifuged), washed, and treated with a water-miscible organic solvent to dehydrate the crystals. The resulting platelets are thereafter dried, e.g., at room temperature overnight, or in an oven at 110° C for an hour.

Gypsum platelets useful in preparation of the nacreous pigments hereof may also be prepared by other procedures, e.g., by converting the hemihydrate ($CaSo_4.1/2H_2O$) to gypsum ($CaSO_4.2H_2O$). Suitable plate-like gypsum particles may also be formed from selenite, the natural mineral form of gypsum which is relatively clear, transparent and in the desired crystal form. Large selenite crystals can be broken down mechanically, and the finely divided crystals thus obtained classified by known particle classification techniques.

Whichever of the preceding operations is utilized, the plate-like gypsum particles formed facilitate deposition of the desired $TiO_2$ coating thereon and, surprisingly, maintain their crystal morphology and mechanical integrity throughout subsequent processing, notwithstanding the fact that such involves the use of relatively vigorous acidic and elevated temperature conditions.

The gypsum crystals are subsequently converted to the anhydrite ($CaSO_4$), the latter serving as the permanent substrate for the TCC pigments. The gypsum is so transformed by an additional heating step, with the initial formation of the hemihydrate ($CaSO_4.1/2H_2O$) followed by conversion to the anhydrite when heated to temperatures above 400° C. Since the conversion to anhydrite inherently takes place during the later calcining operation, it is not necessary to employ an additional intermediate step to effect the transformation although such a step may, of course, be added if desired. Preferably, the plate-like gypsum particles are directly coated with $TiO_2$ in the manner described below.

A portion of the anhydrite substrate may be converted, during the heating or calcining operations, to calcium titanate ($CaTiO_3$). It will be understood, however, that as used herein the term "anhydrite" includes any such titanate portion as well as that portion of the substrate which is in the form of pure $CaSO_4$.

2. Preparation of TCC Pigments in the Rutile Form

As previously indicated, in view of the superior reflectivity and light stability characteristics of the rutile form of $TiO_2$, preparation of the $TiO_2$ pigments hereof in such form is preferred. It has now been found that preparation of the rutile form is insured by treating the plate-like gypsum particles, either prior to or concurrent with deposition of the $TiO_2$ thereon, with an acidic solution of a soluble tin compound. The tin compound pre-treatment (step 13 in FIG. 1) may be carried out employing any tin compound in either the stannous or stannic states, the use of stannous or stannic chloride being, however, particularly convenient.

The acid concentration in the tin compound solution must be sufficient to prevent hydrolysis of the tin compound upon dilution with water, but still low enough to permit hydrolysis at temperures above ambient. Employing, for example, an aqueous hydrochloric acid solution of $SnCl_4.5H_2O$, stannic chloride concentrations of from about 1 to 5 percent and hydrochloric acid concentrations of from about 0.3 to 0.8 percent may be conveniently utilized. Typically, the tin compound solution and the plate-like gypsum crystals are mixed for a period of from about 1–5 minutes, filtered, and the treated crystals are recovered. Such crystals may thereafter be treated with a titanium salt or ester-containing solution (FIG. 1, step 13a), and heated in step 14a to form an amorphous $TiO_2$ coating on the gypsum substrate.

Figure 1:
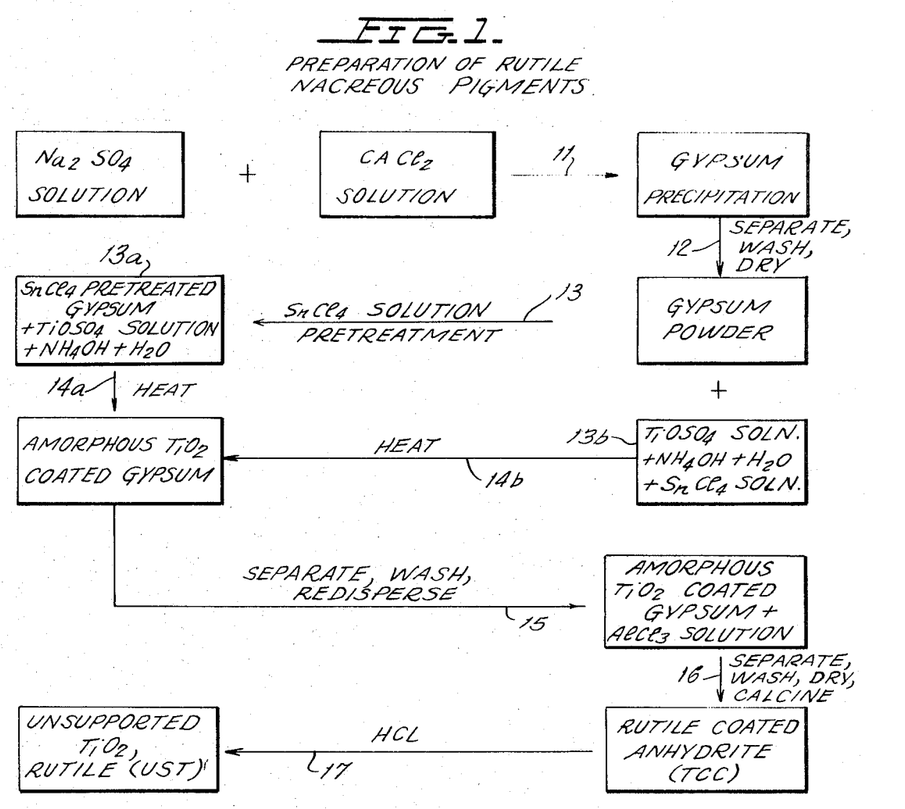
FIG. 1 is a diagrammatic flow sheet illustrating a preferred reaction scheme in accordance herewith for the preparation of $TiO_2$ nacreous pigments wherein the $TiO_2$ is in the form of rutile.

Alternatively, the tin compound solution may be incorporated in the titanium treatment bath at 13b and the pre-treatment and $TiO_2$ coating simultaneously carried out, followed by a heating step 14b to produce the intermediate amorphous $TiO_2$-coated product. In the latter instance, the tin compound, e.g., $SnCl_4.5H_2O$, may suitably be incorporated in the titanium salt (e.g., $TiOSO_4$)-containing bath in an amount of from about 0.10 to 1.50 percent, preferably about 0.50 percent.

Whichever technique is utilized to carry out the tin compound pre-treatment, the $TiO_2$ coating may also be formed by the hydrolysis of $TiCl_4$. The $TiO_2$ coating is most conveniently and economically effected employing titanyl sulfate as the $TiO_2$ source. $TiOSO_4$ is available commercially as a presscake of about 50 percent solids containing an approximately equal weight of $H_2SO_4$ (Enelchem Titanyl Sulfate Cake, Titanium Pigments Corp., National Lead Co., New York), or as an acidic solution in water. The presscake is diluted with water and stirred to a $TiO_2$ equivalent concentration of 1–5 percent. Usually it is advantageous to reduce the acidity of the titanium sulfate solution by the addition of an alkaline material such as NaOH, KOH, $NH_4OH$, $NaHCO_3$, $(NH_4)_2CO_3$, or any other common and readily available, water-soluble alkaline material. Preferably about one-fourth to three-fourths of the acidity is thus neutralized, the partial neutralization favoring the hydrolysis reaction.

Generally, the coating bath contains from about 1 to 10 percent $TiO_2$ equivalent on a weight basis, 2–4 percent being preferred. The plate-like gypsum crystals are added to the coating bath in amounts such as those illustrated in Table I below, the amount of gypsum per unit of titanyl sulfate coating bath determining the final $TiO_2$ coating reflection color (since it determines the thickness of the $TiO_2$ coating deposited thereon). The particle dimensions and quantity of the gypsum particles incorporated in the coating bath determines the total available surface area for $TiO_2$ deposition. Accordingly, these parameters may be chosen in conjunction with the $TiO_2$ equivalent concentration to provide $TiO_2$ coatings of pre-determined thicknesses, and hence, optical characteristics.

The titanium compound-gypsum slurry is heated, with mixing, to reflux (usually about 98°–103° C), and the slurry is held at reflux for about 10–90 minutes, about 20–60 minutes being preferred. The reaction can be suitably carried out at temperatures below reflux, e.g., at from about 70° to 100°, but the $TiOSO_4$ hydrolysis to the hydrated amorphous $TiO_2$ takes considerably longer at lower temperatures. For example, at 90° C, about 80 minutes heating is required to obtain the same type of product produced after heating for 25 minutes at reflux. At 80° C, the same type of product requires 3-½ hours.

Unexpectedly, the gypsum crystals maintain their integrity in the reaction medium, and are not chemically changed or etched by the strongly acidic conditions. Yield data shows that about 25–35 percent of the gypsum is dissolved in this reaction medium, but there is no evidence of chemical attack or partial dissolution of the crystals. A possible explanation for this behavior is that since gypsum is somewhat soluble in the reaction medium, small crystals or broken crystals are dissolved in preference to larger whole crystals.

Upon substantial completion of the hydrolysis reaction (with deposition of up to about 90 percent of the available $TiO_2$), the $TiO_2$-coated gypsum crystals are separated and washed by any convenient method, as by filtration or centrifugation (step 15), until the wash water shows a pH in the range of about 2.5–4.5.

In accordance with a further feature of the present invention, the amorphous $TiO_2$ coating thus formed may then be treated with a soluble aluminum compound in order to improve the luster and smoothness of the rutile pigment produced upon calcining of the coating. The aluminum compound treatment is carried out by re-suspending the amorphous $TiO_2$ coated gypsum in water, at a concentration in the range of from about 5 to 25 percent, adjusting the pH with alkali, e.g., $NH_4OH$, and adding a water-soluble aluminum compound to the suspension with agitation. Any convenient water-soluble aluminum compound, e.g., aluminum chloride, aluminum sulfate, or sodium aluminate, may be so added, the use of $AlCl_3.6H_2O$ being most convenient.

The aluminum compound is preferably admixed in the form of a dilute solution having a concentration within the range of from about 1 to 10 percent, preferably about 2–5 percent, of the weight of the composite pigment product. After stirring for a period of from about 10 minutes to 2 hours, preferably about 0.5–1 hour, the pigment is separated by filtration or centrifugation, washed, dried and calcined, as indicated in step 16 of the flow sheet.

Calcination of an amorphous $TiO_2$ coating converts the same, as is well known, to crystalline $TiO_2$ in the form of rutile or anatase. Normally, calcining at temperatures of from about 600° to 750° C results in formation of the anatase form of $TiO_2$ whereas calcining at higher temperatures of from about 800° to 950° C produces rutile. Employing the tin compound pretreatment hereof, however, rutile is formed upon calcining at temperatures throughout the range of from about 600° to 950° C. Moreover, when the coating is thus pre-treated and the final product is calcined at about 800°–900° an improved pigment exhibiting superior color and luster is obtained. It is believed that the presence of the tin compound during the hydrolysis and deposition of the hydrated amorphous $TiO_2$ in some way influences the $TiO_2$ to nucleate in the rutile form, thus avoiding the anatase-rutile transformation.

Calcination to the rutile-containing pigment may thus be carried out at temperatures throughout the indicated range and for periods varying from about 5 minutes to 4 hours, the duration of the calcination varying inversely with the particular temperature utilized. For example, at 600° C it is preferred that the calcining operation be carried out for at least 30 minutes; at 900°–950° C, 5 minutes suffices.

The TCC pigment product formed upon calcination comprises a rutile plate-like coating having thicknesses of from about 5 to 500 nm coated on and supported by calcium sulfate anhydrite platelets. The latter possesses substantially the same particle dimensions of the original gypsum crystals, shrinkages of up to about 20% in thickness being possible, however, during the transformation from the original $CaSO_4 \cdot 2H_2O$ to the final $CaSO_4$ substrate. As a result of the noted treatments, the composite pigment additionally incorporates tin, or tin and aluminum, in the form of their respective oxides.

The rutile-containing pigment generally contains from about 30 to 85 percent anhydrite, the greater the quantity of the anhydrite the larger its surface area and, consequently, the thinner the rutile coating (for a coating bath of any given concentration). Thus, the nacreous TCC pigments have the highest anhydrite contents while the first, second or higher interference colors have progressively smaller anhydrite contents. Table I below illustrates different interference pigments which can be thus obtained, employing a coating bath of a specified concentration but varying the gypsum content thereof:

TABLE I

Optical Thicknesses and Amounts of Anhydrite in TCC Pigments of Different Colors

| Reflection Color | Optical Thickness (nt) | Thickness, Rutile | Weight of Gypsum Crystals[1] | $CaSO_4$ in Pigment[2] |
|---|---|---|---|---|
| Pearl White | 125 nm | 48 nm | 140 g. | 82% |
| Gold | 190 | 73 | 92 | 75 |
| Red | 250 | 96 | 72 | 67 |
| Blue | 310 | 120 | 58 | 60 |
| Green | 350 | 135 | 48 | 52 |

[1] In 1.0 liter of $TiOSO_4$ solution, which contains 2.5% by weight of $TiO_2$ equivalent.

[2] Proportion by weight of $CaSO_4$ in the total pigment.

The tin additive is present in the composite rutile-containing pigment in proportions of up to about 0.15 part, preferably from about 0.05 to 0.13 part, expressed as the oxide ($SnO_2$), per part of the $TiO_2$ content thereof. When the aluminum additive is also incorporated in the pigment it is present (in addition to the above-noted amounts of tin) in amounts of up to about 0.25 part, preferably from about 0.075 to 0.23 part, expressed as alumina ($Al_2O_3$), per part of the $TiO_2$ content of the composite material.

As indicated hereinabove, it is believed that the tin may act as a nucleating agent promoting formation of the $TiO_2$ in the rutile form. It is further postulated that, where the aluminum compound treatment is additionally employed, some of the hydrolyzed aluminum compound is deposited in the interstices or in the pores of the coating, imparting greater cohesiveness and smoothing the coating so that after calcining the pigment product exhibits greater mechanical integrity and submicroscopic smoothness. Such properties are, of course, important determinants of the optical characteristics of nacreous pigments. It is surprising that the TCC pigments may be thus prepared with uniform and smooth surfaces notwithstanding the several crystalline changes during transformation of the gypsum substrate to the anhydrite form. These changes lead to roughening of the substrate surfaces at submicroscopic levels; nevertheless, it has been found that the overlying $TiO_2$ coatings prepared as described hereinabove retain their smoothness, and resist the tendency to roughen and disintegrate upon calcining.

3. Preparation of TCC Pigments in the Anatase Form

Figure 2:
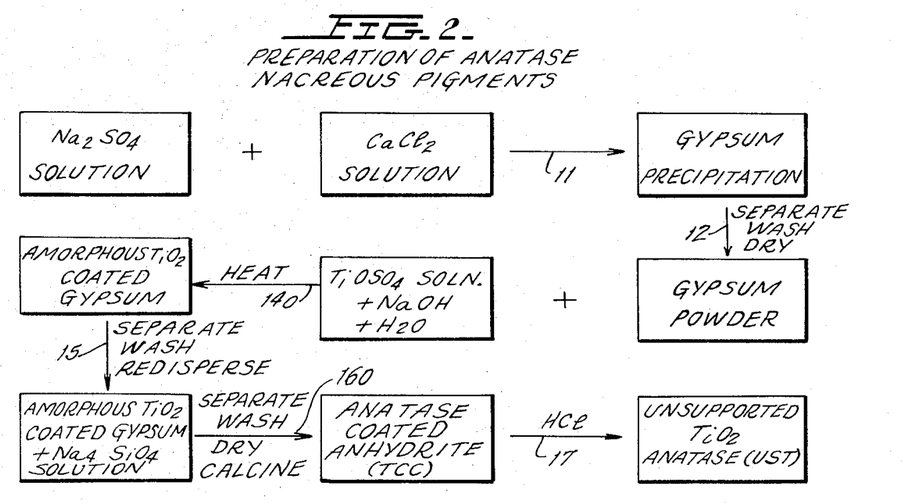
FIG. 2 is a diagrammatic flow sheet similar to FIG. 1 illustrating the preparation of nacreous pigments within the scope of the invention wherein the $TiO_2$ is in the form of anatase.

Nacreous pigments in the anatase form are prepared in accordance with the invention by the successive steps illustrated in FIG. 2 of the drawings. Initially, the amorphous $TiO_2$-coated gypsum is produced as outlined in steps 11, 12 and 140 by procedures analogous to those described above in connection with the formation of rutile pigments without, however, the use of tin compound pre-treatment or aluminum compound post-treatment.

Normally, anatase is formed by conducting the calcining operation at temperatures of from about 600° to 750° C. The material thus produced does not, however, exhibit optimum luster or stability characteristics. In order to improve these pigment properties the calcination may be conducted at higher temperatures, e.g., from about 800° to 950° C, at which the rutile form of $TiO_2$ is produced. The product so formed does not, unfortunately, maintain its physical or geometric integrity, the individual particles being broken up with consequent impairment of the optical characteristics of the pigment. To overcome these deficiencies the tin and aluminum compound treatments described hereinabove may be utilized and the pigment obtained in the rutile form, or the amorphous $TiO_2$ product may be treated to produce markedly improved anatase pigments.

In particular, it has been found that when the amorphous $TiO_2$ coated gypsum is treated with a dilute solution of a silica-producing material, e.g., sodium silicate ($Na_4SiO_4$, 40°–42° Be, 34–38 percent), the thus treated product may, after drying, be calcined at temperatures of from about 800° to 950° C and anatase pigments having markedly improved lusters and stabilities thereby formed. Employing this procedure, the washed amorphous $TiO_2$ product is redispersed (step 15) in water at a concentration of from about 5 to 25 percent, preferably about 10–20 percent. The resulting suspension is adjusted to an approximately neutral pH with aqueous $NH_4OH$, and the sodium silicate solution, in an amount of from about 10 to 100 percent of the weight of the pigment, preferably about 25–50 percent, is added. The mixture is stirred for about 0.5–3 hours and heated to from about 50° to 90° C, preferably about 70°–80° C. The pH is maintained at about 9–10 by the addition of NH$_4$OH solution. The pH is thereafter lowered to the range of 3–6 by the addition of dilute HCl, followed by recovery of the pigment by centrifugation or filtration, washing with distilled water to remove soluble salts, and finally washing with a water-miscible organic solvent, isopropanol being preferred.

The pigment is dried, and may then be calcined at 800°–950° C. The product is anatase TiO$_2$ on anhydrite, incorporating the silicon additive in proportions of up to about 0.17 parts, preferably about 0.02 to 0.10 parts, expressed as silica (SiO$_2$), per part of the TiO$_2$ portion of the composite pigment.

It may thus be seen that the TCC pigments may be prepared in the form of either rutile or anatase coatings, depending on the particular treatments utilized in connection with formation of the initial amorphous TiO$_2$ coating on the gypsum substrate. The following table summarizes the product variations which may be so obtained:

reach the substrate material in two ways. First, the TiO$_2$ coating has some porosity, and the solution diffuses through the TiO$_2$ coating. Secondly, the coatings are not perfect nor do they remain so, and in the course of handling and treatment, particularly the mixing, some of the TiO$_2$ coating is damaged, exposing the calcium sulfate substrate to the solution. It is believed that by the combination of these two methods, the bulk of the calcium sulfate substrate is reached by the solution, attacked and dissolved.

The degree of dissolution of the calcium sulfate substrate to UST may be determined by analysis or by examination of the X-ray diffraction powder pattern of the dried pigment. Under the microscope it can be seen that the arrowhead shape of the original platelets is maintained, even with the chevron appearance of the surfaces, but that many of the TiO$_2$ platelets show some breakage or fragmentation. It may further be determined that the unsupported TiO$_2$ platelets are primarily a single layer structure and not part of a multi-layer sandwich characteristic of the TCC pigments.

After dissolution, up to about 20 percent, and gener-

TABLE II

Variations in TCC Pigment Compositions Resulting from Processing Modifications

| Pre-Treatment | TiO$_2$ Coating | Post-Treatment | 1 Hour Calcine | Product Ca Sulfate | TiO$_2$ |
|---|---|---|---|---|---|
| None | TiOSO$_4$ | None | None | Gypsum | Amorphous |
| None | TiOSO$_4$ | None | 700° | Anhydrite | Anatase |
| None | TiOSO$_4$ | None | 900° | Anhydrite | Rutile |
| None | TiOSO$_4$ | Na Silicate | 900° | Anhydrite | Anatase |
| SnCl$_4$·5H$_2$O | TiOSO$_4$ | None | 700° | Anhydrite | Rutile |
| SnCl$_4$·5H$_2$O | TiOSO$_4$ | AlCl$_3$·6H$_2$O | 900° | Anhydrite | Rutile |
| None | TiOSO+SnCl$_4$·5H$_2$O | AlCl$_3$·6H$_2$O | 900° | Anhydrite | Rutile |

4. Preparation of UST Pigments

The UST pigments can be prepared from the TCC products by dissolving the calcium sulfate substrate with any of a number of different agents, conveniently in aqueous solution. The agents include the common mineral acids (HCl, H$_2$SO$_4$, HNO$_3$), acetic acid, alkaline materials such as NaOH, NH$_4$OH, or KOH, and chelating agents for calcium such as ethylenediaminetetraacetic acid. Most conveniently, this process can be carried out employing HCl or HNO$_3$ to dissolve the anhydrite substrate The TCC pigment is dispersed in the aqueous acid at a concentration of about 1.0–10 percent, the acid concentration being about 1–25 percent. The treatment may be carried out at room temperature for periods of from about 3 to 20 hours, at boiling or reflux conditions for 0.5–5 hours, or at intermediate temperatures and time intervals. Use of the lower acid concentrations and ambient temperatures necessitates longer treatment times, while the reflux conditions and higher acid concentrations can be employed for shorter intervals.

During this treatment, it is best that the initial acid concentration be at least twice the stoichiometric amount for reaction with the calcium sulfate. When this treatment has been completed, the pigment is collected by centrifugation or filtration, washed with water, and dried, e.g., at ambient temperature overnight, or in an oven at 100° C for three hours.

The agent which dissolves the calcium sulfate may ally from about 2 to 16 percent (typically 10 percent), of the UST pigments comprise residual portions of the former anhydrite substrate. Only negligible proportions of the TiO$_2$, and tin, aluminum or silicon additives are lost during conversion of the TCC to the corresponding UST pigments. Thus, the rutile-containing UST pigment incorporates up to about 0.15 part, preferably from about 0.05 to 0.13 part (expressed as SnO$_2$), of the tin additive and, if the aluminum additive is also present, up to about 0.25 part, preferably from about 0.075 to 0.23 part (expressed as Al$_2$O$_3$), of the aluminum additive, per part of TiO$_2$. The anatase-containing pigment, on the other hand, includes up to about 0.17 part, and preferably about 0.02 to 0.1 part (expressed as SiO$_2$), of the silicon additive per part of the TiO$_2$ content thereof.

Since the anhydrite portions of the UST pigments do not vary as in the case of the TCC pigments, the UST pigments may be readily defined in terms of their total compositions, as well as by the relative proportions specified hereinabove. Thus, the UST pigments may incorporate the several ingredients in the following amounts:

|  | Rutile UST Pigment | Anatase UST Pigment |
|---|---|---|
| TiO$_2$: |  |  |
| Maximum | 80% | 90% |
| Range | 60–75% | 70–85% |

|  | Rutile UST Pigment | Anatase UST Pigment |
|---|---|---|
| Anhydrite: | | |
| Maximum | 20% | 20% |
| Range | 2–16% | 2–16% |
| Tin (as $SnO_2$) | | |
| Maximum | 12% | — |
| Range | 4-10% | — |
| Aluminum (as $Al_2O_3$): | | |
| Maximum | 20% | — |
| Range | 6–18% | — |
| Silicon (as $SiO_2$) | | |
| Maximum | — | 15% |
| Range | — | 2–10% |

In the following table analyses are set forth for a number of typical UST products in the rutile form. The total calcium content is expressed in the tabulation as "$CaSO_4$" for convenience, although the calcium is present both in such form and as $CaTiO_3$, the latter being detected by the X-ray diffraction technique.

TABLE III

Typical Analyses of Differing UST Rutile Nacreous Pigments

| Reflection Color | $TiO_2$ | "$CaSO_4$" | $Al_2O_3$ | $SnO_2$ | Total |
|---|---|---|---|---|---|
| Gold | 72.7% | 8.1% | 11.2% | 8.1% | 99.6% |
| Red | 70.7 | 7.0 | 13.5 | 8.4 | 99.6 |
| Blue | 71.3 | 7.1 | 13.4 | 8.3 | 100.1 |
| Green | 66.8 | 7.9 | 16.8 | 9.1 | 100.6 |

The following examples illustrate preferred forms of the present invention without, however, being restrictive thereof. In the examples, as well as the preceding description, all parts and percentages are expressed by weight, and all temperatures in degrees Centigrade, unless otherwise indicated. The treatments utilized, and the pigment products produced, in the respective examples are outlined for convenience in the following table:

TABLE IV

Variations in Examples of the Invention

| Pre-Treatment | TCC Ex. | Post-Treatment | UST Ex. | Reflection Color | $TiO_2$ X-ray Diffraction |
|---|---|---|---|---|---|
| None | 1 | None | — | Pearl | Anatase |
| None | 2 | Na Silicate | 7 | Gold | Anatase |
| Sn | 3 | None | 6 | Pearl | Rutile |
| Sn | 4 | Al | 9 | Blue | Rutile |
| Sn | 5 | Al | 8 | Red | Rutile |
| Sn | — | Al | 10 | Green | Rutile |

EXAMPLE 1

Preparation of a Pearl Anatase TCC Pigment

A. Preparation of Plate-Like Gypsum Substrate 41.0 g of anhydrous $Na_{SO4}$ are dissolved in 1,900 ml of distilled water. The solution is placed on a magnetic hot plate and subjected to rapid stirring while being heated to 55°C.

A second solution is prepared by dissolving 42.4 g of $CaCl_2·2H_2O$ in 100 ml of distilled water containing 0.10 g of oxalic acid. This solution is added all at once to the first solution, small crystals forming in 7-10 seconds. The stirring is continued for 20 minutes while maintaining the temperature at 50° C.

The product is then suction filtered followd by washing three times with 750 ml of distilled water. The product is dried overnight in air at ambient temperature, yielding 36.5 g of a soft lustrous material. Under the microscope, it is observed that the product consists essentially of plate-like, arrowhead shaped crystals the average long dimension of which is 20–30 microns.

As a control, a solution of sodium sulfate is prepared by adding 30.75 g of anhydrous $Na_2SO_4$ to 750 ml of distilled water and bringing the temperature to 55° C on the magnetic hot plate while stirring the solution rapidly, A second solution is prepared by adding 51.5 g of $CaCl_2·2H_2O$ to 750 ml distilled water and heating to 55° C. The second solution is added rapidly to the first solution. In about 5-10 seconds, crystallization commences. Stirring is continued for 30 minutes at 55° C, and the resulting slurry is filtered. The filter cake is washed four times with 250 ml of distilled water followed by 250 ml of isopropanol. The product is dried at 120° C for 2 hours.

The control product thus prepared, 31.6 g of $CaSO_4·2H_2O$, has a lustrous, fluffy and white appearance. When these gypsum crystals are examined under the microscope, it is observed that most crystals have a longest dimension in the range of 10-50 microns. Most crystals are also flat plates showing the arrowhead shape with a chevron appearance. Some of the crystals are, however, rod-shaped or relatively flat and boat-shaped.

B. Preparation of the TCC Pigment 40 ml of a titanyl sulfate solution, characterized by a specific gravity of 1.32, 25 weight % $H_2SO_4$, and 9.5% equivalent $TiO_2$ content, is diluted to 100 ml with distilled water in a round bottom flask fitted with a reflux condenser and containing 25 g of plate-like gypsum prepared in the presence of oxalic acid as described above. The slurry is stirred and heated to reflux in about 15 minutes, and thereafter maintained at reflux for 60 minutes. By means of a glass rod, drops of the slurry are removed at intervals and placed on a black glass plate. It can be seen that a pigment of increased coverage and reflectivity is thus formed.

The slurry is filtered hot and washed with distilled water until the filtrate is at a pH of 3-4. The filtrate is washed once with 50 ml of isopropanol and then dried at 100° C for 1 hour. The dried product is a fluffy white lustrous powder. Analysis indicates that 89% of the $TiO_2$ available from the coating bath deposits on the gypsum.

The product is calcined for 2 hours at 650° C. The dried product shows enhanced luster. The yield is 22.5 g. The X-ray diffraction powder pattern of the material indicates the product is primarily constituted of anatase $TiO_2$ on anhydrite. Analysis shows the product to consist of 81% $CaSO_4$ and 19% $TiO_2$. In the reflection microscope, the general shape and characteristics of the gypsum crystal can be seen to be unimpaired, along with some intensification of reflectivity and color. A white pearly luster is exhibited upon spreading of some of the powder on the skin.

EXAMPLE 2

Preparation of a Gold Anatase TCC Pigment Employing a Sodium Silicate Post-Treatment A slurry of gypsum crystals prepared as described in Example 1A, isolated before drying and containing 21.0 g of gypsum crystals, is treated as further described in that example. After washing and drying, the product exhibits a gold-reflection color. 15.0 g of this material is re-slurried in 500 ml of distilled water, and ammonium hydroxide is added to raise the pH to 7-8.

5.0 g of sodium silicate solution (40°–42° Be, 34–38% $Na_4SiO_4$), diluted to 50 ml with distilled water, are added to the above slurry, and the pH rises to 8-9. Ammonium hydroxide (concentrated) is added to adjust the pH to 9-10 and to maintain this pH while the slurry is heated to 70°–80° C with stirring, and held under these conditions for 1 to 1½ hours.

The pH is then adjusted to 3-4 by the addition of dilute HCl. The slurry is filtered and washed four times with 150 ml portions of distilled water, followed by 50 ml of isopropanol. The material is dried in an oven at 100° C for 1½ hours. It is then calcined for 2 hours at 650° C and for a further 2 hours at 900° C.

The final product exhibits a bright gold reflection color. The sodium silicate post-treatment makes calcining possible at the higher temperatures without impairing the integrity of the $TiO_2$ coating on the $CaSO_4$ substrate. The higher calcining temperature yields a product with improved aging and light stabilities. X-ray diffraction shows the product to comprise an anatase coating on anhydrite. It is found by analysis that the product is 74% $CaSO_4$, 24.3% $TiO_2$, and 1.7% $SiO_2$.

EXAMPLE 3

Preparation of a Pearl Rutile TCC Pigment Employing a Tin Compound Pre-Treatment 25.0 g plate-like gypsum prepared as described in Example 1A are dispersed in 100 ml of distilled water containing 2.0 g of $SnCl_4·5H_2O$ and 1.0 ml of 36% HCl and stirred for 1.0 minute. The slurry is filtered, and the wet filter cake redispersed in 100 ml of a dilute titanyl sulfate solution (the solution of Example 1 diluted with an equal volume of distilled water). The slurry is heated to reflux and maintained at reflux for 60 minutes.

The slurry is filtered, washed with distilled water to pH 3-4, and then washed with 100 ml of isopropanol. The material is dried in an oven at 110° C for 1.5 hours and then calcined for 1 hour at 900° C. The product is bright and silvery in appearance. The X-ray diffraction powder pattern indicates the material is substantially rutile $TiO_2$ on anhydrite. The composition of the product by analysis is 80% $CaSO_4$, 18% $TiO_2$, and 2.0% $SnO_2$.

EXAMPLE 4

Preparation of a Blue Rutile TCC Pigment Employing an Aluminum Compound Post-Treatment 13.0 g of plate-like gypsum prepared as described in Example 1A are treated with a stannic chloride solution as in Example 3, followed by dispersion of the treated gypsum crystals in a titanyl sulfate solution as indicated in the same example, and heating to reflux and maintaining reflux for 60 minutes.

Removal of drops of the reaction mixture and placing them on a black glass plate indicates that the reflection color progresses through the course of the reaction from a silvery white to gold, red and finally blue. The slurry is then filtered and washed with distilled water to pH 3-4. The filter cake is re-dispersed in 100 ml of distilled water. With stirring, 40 ml of a 5.0 percent solution of $AlCl_3·6H_2O$ are added slowly over 15 minutes. Then dilute $NH_4OH$ solution is added slowly to raise the pH to 9.0, and the pH is maintained for 1 hour with stirring at room temperature.

The slurry is filtered and washed, and the filter cake dried at 110° C for 1 hour. The dried material is then calcined for a further hour at 900° C. The final product exhibits a lustrous blue reflection color. Under the reflection microscope, it may be noted that the arrowhead platelet shape is thus maintained, and a predominant and strong blue reflection color is seen. The product is primarily rutile $TiO_2$ on anhydrite, as revealed by the X-ray diffraction powder pattern. Analysis reveals a pigment composition of 58% $CaSO_4$, 35% $TiO_2$, 2.7% $SnO_2$, and 4.3% $Al_2O_3$.

EXAMPLE 5

Preparation of a Red Rutile TCC Pigment Employing an Aluminum Compound Post-Treatment 65.0 g of the titanyl sulfate solution of Example 1B (equivalent to 6.5 g of $TiO_2$) are treated with sufficient solid $(NH_4)_2CO_3·H_2O$ to neutralize 50 percent of the free (titratable) acid.

A tin solution is prepared by diluting 30.0 g of $SnCl_4·5H_2O$ and 18.0 g of concentrated HCl to 100 ml with distilled water. The partially neutralized titanyl sulfate solution is mixed with 2.5 ml of the tin solution and 135 ml of distilled water, to form a coating bath.

The coating bath is poured into a 3-neck round bottom flask containing 18.0 g of gypsum crystals (prepared as described in Example 1A) and stirred. The 3-neck flask is fitted with a water-jacketed reflux condenser and a thermometer, and the third neck is used for periodic sampling of the slurry.

The reaction mixture is heated to 70° C at which temperature 25 ml of a dilute tin chloride solution (1.25 g of tin solution diluted with $H_2O$ to 25 ml) are added dropwise over a 20-minute period. Heating is continued to reflux, and the slurry held at reflux for 30 minutes.

The slurry is filtered immediately and the filter cake washed three times with 100 ml portions of distilled water. The filter cake is then slurried with distilled water to 150 ml.

The slurry is stirred, and dilute $NH_4OH$ added to adjust the pH to 8.0. Using additional dilute $NH_4OH$, the pH is held at about 8.0 with stirring for 1 hour at room temperature. Then 80 ml of 2.0 percent sodium aluminate $(Na_2O·Al_2O_3·3H_2O)$ solution are added at the rate of 1.5 ml per minute, and the slurry stirred for an additional 2 hours.

The slurry is then filtered and washed twice with 100 ml portions of distilled water. The material is dried at 125° C for 2 hours and then calcined for 1.5 hours at 850° C.

The product possesses a reddish reflection color with good luster. X-ray diffraction analysis characterizes the product as principally rutile on anhydrite. Analysis shows that the nacreous pigment composition consists of 69% $CaSO_4$, 25.5% $TiO_2$, 2.1% $SnO_2$, and 3.4% $Al_2O_3$.

EXAMPLE 6

Preparation of a Pearl UST Pigment 10.0 g of the pearl $TiO_2$-coated anhydrite TCC product of Example 3 are dispersed in 500 ml of 5.0 percent $HNO_3$ solution, and the slurry stirred and heated at reflux for 3 hours. The slurry is then filtered, and the filter cake washed four times with 120 ml portions of distilled water. The filter cake is dried for 2 hours at 130° C to yield 2.9 g of a fluffy pearl-white powder.

Examination by reflection microscopy shows that most platelets retain the arrowhead shape, while others are fragments of this shape. Analysis shows the product to be 74% $TiO_2$, 18% $CaSO_4$, and 8.3% $SnO_2$. It is understood that the calcium is represented in the analysis as "$CaSO_4$" for the sake of simplicity, recognizing that some calcium may be present as $CaTiO_3$.

EXAMPLE 7

Preparation of a Gold UST Pigment 10.0 g of the gold-reflecting TCC product of Example 2 are diluted with 400 ml of 2.0% HCl solution and stirred for 60 minutes at 95° C. The slurry is filtered, washed with 400 ml distilled water and then with 100 ml isopropanol. The product is dried at 100° C for one hour. 3.3 g of a bright, gold-reflecting powder are obtained. Viewing with the reflection microscope indicates that most platelets are fragments of the arrowhead shape, the fragments showing a predominantly gold reflection color. The X-ray diffraction powder pattern indicates that the material is primarily constituted of anatase $TiO_2$. Analysis shows the product to contain 85% $TiO_2$, 9.0% $CaSO_4$, and 6.0% $SiO_2$.

EXAMPLE 8

Preparation of a Red UST Pigment 10.0 g of the TCC product of Example 5 are mixed with 75 ml of distilled weater. 75 ml of a 30 weight percent solution of tetrasodium ethylenediamine tetraacetate is added dropwise to this slurry over a 30-minute period. A pH of about 10.0 is thus attained. The slurry is stirred at room temperature for 30 minutes and then filtered. The filter cake is washed four times with 125 ml portions of distilled water and then dried in an oven at 110° C for 2 hours. 3.65 g of product are obtained.

The product is a fluffy red-reflecting powder which can be rubbed on the skin and adheres easily. The product is substantially rutile $TiO_2$, as evidenced by its X-ray diffraction powder pattern. Analysis reveals a composition expressed by 72% $TiO_2$, 7.1% $SnO_2$, 11.1% $Al_2O_3$, and 10.5% $CaSO_4$.

EXAMPLE 9

Preparation of a Blue UST Pigment 10.0 g of the TCC product of Example 4 are dispersed in 150 ml of 17% $HNO_3$ solution, and the slurry refluxed for 90 minutes. The slurry is then filtered and washed three times with 150 ml portions of distilled water. The filter cake is dried at 150° C for 1 hour to yield 4.3 g of a bright blue-reflecting fluffy powder. The product is primarily rutile $TiO_2$, according to its X-ray diffraction powder pattern. Analysis shows the product to be 74% $TiO_2$, 6.3% $SnO_2$, 10.2% $Al_2O_3$, and 10.1% of $CaSO_4$.

EXAMPLE 10

Preparation of a Green UST Pigment

A green TCC product is prepared according to the method of Example 4, except that 11.5 g of plate-like gypsum (Example 1A) are used rather than 13.0 g. 10.0 g of the green-reflecting TCC product are treated as in Example 9, to obtain 4.8 g of the green-reflecting UST product.

The X-ray diffraction powder pattern identifies the product as rutile. Examination in the reflection microscope shows the product to be mainly green-reflecting arrowhead platelets, and only occasional fragments of broken platelets may be seen. Analysis yields a composition of 73% $TiO_2$, 6.1% $SnO_2$, 10.9% $Al_2O_3$, and 11.2% $CaSO_4$.

The preceding examples illustrate preferred procedures for preparing the plate-like gypsum substrate particles, coating such particles with the amorphous $TiO_2$, modifying the amorphous product to impart desired characteristics to the ultimate pigment, calcining the same to produce the TCC nacreous pigments, and dissolving the anhydrite pigment substrates to obtain the UST pigments. It will be understood that various modifications may be made in these examples or in the preferred embodiments described without departing from the scope of the invention. Thus, nacreous pigments may be prepared in accordance with the present invention exhibiting other reflection colors, or exhibiting second or higher reflection colors in lieu of the first color pigments exemplified hereinabove. The $TiO_2$ layers of the second colors, for example, are approximately twice as thick as the $TiO_2$ layers of the first colors. It should be further understood that the invention is not limited by the proposed operative mechanisms postulated hereinabove, such being disclosed solely in an effort to provide some explanation of the mechanism of the present invention in the light of present knowledge. Accordingly, the invention should not be limited by the preceding description but only by the following claims.

What is claimed is:

1. A nacreous pigment, comprising from 30 to 85% by weight of plate-like anhydrite particles having lengths of from 5 to 70 microns and thicknesses of from 0.1 to 1.0 microns, and crystalline titanium dioxide coatings thereon having thicknesses of from 5 to 500 nm, said coatings containing tin, tin and aluminum, or silicon additives in oxide form; said additive being present in the amount of up to about 0.25 part aluminum trioxide, up to 0.15 part tin dioxide, or up to 0.17 part silicon dioxide per part of titanium dioxide.

2. The nacreous pigment of claim 1, wherein the additive is tin dioxide and said titanium dioxide is in the form of rutile.

3. The nacreous pigment of claim 1, wherein the additive is silicon dioxide and said titanium dioxide is in the form of anatase.

4. A nacreous pigment, comprising unsupported crystalline titanium dioxide platelets having lengths of from 5 to 70 microns and thicknesses of from 5 to 500 nm, incorporating anhydrite in amounts of up to 20% by weight, and tin, tin and aluminum, or silicon additives in oxide form; said additive being present in the amount of up to about 0.25 part aluminum trioxide, up to 0.15 part tin dioxide, or up to 0.17 part silicon dioxide per part of titanium dioxide.

5. The nacreous pigment of claim 4, wherein the additive comprises tin dioxide, or tin dioxide and aluminum in oxide form, and said titanium dioxide is in the form of rutile.

6. The nacreous pigment of claim 4, wherein the additive is silicon dioxide and said titanium dioxide is in the form of anatase.

7. A method for the preparation of a nacreous pigment, which comprises:
   a. depositing an amorphous coating of titanium dioxide on plate-like gypsum particles having lengths of from 5 to 70 microns and thicknesses of from 0.1 to 1.0 microns, and
   b. calcining the coated product to convert the gypsum particles to anhydrite and crystallize the titanium dioxide coating thereon.

8. The method of claim 7, wherein the plate-like gypsum particles are formed by reacting a calcium compound and a sulfate in aqueous dispersion and in admixture with a low molecular weight organic acid additive having from one to eight carbon atoms and more than one functional group per molecule, the plate-like gypsum particles precipitating from the dispersion.

9. The method of claim 7, including the further step of dissolving the anhydrite particles formed in step (b) leaving the pigment constituted of the unsupported crystalline titanium dioxide platelets.

10. The process of claim 7, wherein the gypsum particles are treated, prior to or concurrent with deposition of the titanium dioxide in step (a), with a tin compound, the amorphous titanium dioxide coated being converted on calcining to crystalline titanium dioxide in the rutlie form.

11. The method of claim 10, wherein the titanium dioxide coated particles are treated, after step (a), with an aluminum compound, the amorphous titanium dioxide coating being converted on calcining to crystalline titanium dioxide in the rutile form exhibiting superior luster and smoothness.

12. The method of claim 7, wherein the titanium dioxide coated particles are treated, after step (a), with a silica-producing material, the amorphous titanium dioxide coating being converted on calcining to crystalline titanium dioxide in the anatase form exhibiting superior luster and stability.

* * * * *